United States Patent [19]

Pellico

[11] 4,066,602

[45] Jan. 3, 1978

[54] ABRASION RESISTANT ELASTOMERIC COMPOSITION

[76] Inventor: Michael A. Pellico, 3426 Jasmine, Los Angeles, Calif. 90034

[21] Appl. No.: 731,521

[22] Filed: Oct. 12, 1976

[51] Int. Cl.$^2$ .......................... C08K 5/01; C08K 5/02; C08K 5/06; C08K 5/07
[52] U.S. Cl. ................................. 260/30.8 R; 156/94; 260/32.8 A; 260/33.2 R; 260/33.6 A; 260/33.8 UA
[58] Field of Search ..................... 260/30.8 R, 32.8 A, 260/33.2 R, 33.6 A, 33.8 UA, 42.37

[56] References Cited

U.S. PATENT DOCUMENTS

| | | | |
|---|---|---|---|
| 3,251,905 | 5/1966 | Zelinski | 260/33.6 A |
| 3,792,005 | 2/1974 | Harlan | 260/33.8 UA |

OTHER PUBLICATIONS

Condensed Chemical Dictionary (5th Ed.), (Reinhold), (N.Y.), (1956), p. 1172.
Morton-Rubber Technology (2nd Ed.), (Van Nostrand), (N.Y.), (1973), pp. 528–530.

Primary Examiner—Donald E. Czaja
Assistant Examiner—H. H. Fletcher
Attorney, Agent, or Firm—Donald Diamond

[57] ABSTRACT

By blending and mixing an elastomeric block copolymer such as polystyrene-polyisoprene-polystyrene block copolymers, finely divided siliceous material such as silica and/or clay having a specific gravity from about 2.40 to about 2.66, and a solvent for the block copolymer, there is obtained a thick, extrudable, workable, paste-like material which, upon application and evaporation of the solvent, sets to an abrasion and peel resistant elastomer. The compositions, which may be further formulated with pigmentary filler, are particularly well suited for repairing the worn heel and toe portions of tennis shoes.

11 Claims, No Drawings

ABRASION RESISTANT ELASTOMERIC COMPOSITION

BACKGROUND OF THE INVENTION

This invention relates to elastomeric compositions and, more particularly, to abrasion and peel resistant elastomeric compositions for filling, sealing and coating.

Although the compositions of this invention may be used in a wide variety of applications calling for elastomeric compositions having high abrasion and peel resistance, it has been found that the compositions described herein have significant utility in the repair of tennis shoes. Typically, tennis shoes are light, rubber-soled, heelless shoes of canvas or leather which are worn in playing tennis as well as when engaging in other athletic or general activities. During the course of use, the toe and heel portion of the tennis shoes wear away by friction at a rate which is much more accelerated than the general rate of deterioration of the remaining portion of such shoes. Since the remaining portion of such shoes are generally in good condition, it would be advantageous to provide an abrasion and peel resistant elastomeric composition for patching, repairing and reconstructing the worn heel and toe portions so as to bring the soles of these shoes back to their original dimension.

SUMMARY OF THE INVENTION

In accordance with this invention, there is provided abrasion resistant, elastomeric compositions for filling, sealing and coating which comprise:
from about 10 to about 50 wt.% of an elastomeric block copolymer selected from the group consisting of polystyrene-polybutadiene-polystyrene copolymer, polystyrene-polyisoprene-polystyrene copolymer and mixtures of these copolymers, wherein the average molecular weight for each polystyrene block is from about 2,000 to about 100,000, and the average molecular weight for each of the polybutadiene and polyisoprene blocks is from about 25,000 to about 1,000,000;
from about 10 to about 40 wt.% of silica having a specific gravity from about 2.40 to about 2.66; and
a solvent for the elastomeric block copolymer to make up 100 wt.% of the composition, with the concentration of the solvent in the composition being at least about 20 wt.%.

To the aforesaid formulation, there may be added a pigmentary filler in an amount from about 10 to about 20 wt.%.

The compositions are prepared by blending and mixing the ingredients to obtain a homogeneous viscous, paste-like material which, upon evaporation of the solvent, sets to an abrasion resistant, elastomeric material.

DETAILED DESCRIPTION

The elastomeric block copolymers which can be used in formulating the compositions of this invention include polystyrene-polybutadiene-polystyrene copolymer, polystyrene-polyisoprene-polystyrene copolymer and mixtures thereof. The average molecular weight for each polystyrene block is generally from about 2,000 to about 100,000 and preferably from about 5,000 to about 50,000; and the average molecular weight for each of the polybutadiene and polyisoprene blocks is generally from about 25,000 to about 1,000,000 and preferably from about 50,000 to about 500,000. The elastomeric copolymer is generally present in the composition in an amount from about 10 to about 50 wt.% and, preferably, in an amount from about 15 to about 40 wt.%. The aforesaid elastomeric block copolymers useful herein are more fully described with respect to chemical composition, method of preparation and physical properties in U.S. Pat. No. 3,265,765 (Holden et al., 1965) which patent is incorporated herein by reference. These elastomeric block copolymers are available from Shell Chemical Company, Polymers Division, under the designation KRATON thermoplastic rubber.

It has been found that the abrasion and peel resistance of the elastomeric block copolymers hereinabove described are significantly enhanced when these copolymers are compounded with siliceous material such as silica, clay or mixtures thereof having a specific gravity from about 2.40 to about 2.66 and, preferably, from about 2.59 to about 2.66. The preferred silica is finely divided quartz having low fluid absorption characteristics. The preferred clay is kaolin. Siliceous material is generally present in the compositions in amount from about 10 to about 40 wt.% and, preferably, in an amount from about 15 to about 30 wt.%.

The solvents which can be used for dissolving the copolymer and preparation of the fully formulated product generally have a solubility parameter between 7.4 and 10.1 (23° C). See: Mark, Herman F., et al., Eds., Encyclopedia of Polymer Sciences and Technology, Interscience Publishers, Division of John Wiley & Sons, Inc. New York, 1965, Vol. 3, Page 833ff; and Brandrup, J. et al., Eds. Polymer Handbook, Interscience Publishers, Division of John Wiley & Sons, Inc., New York, 1966, Page IV-341. Examples of suitable solvents include: 1,1,1-trichloroethane, ethylene dichloride, dimethyl ether, cyclohexane, methyl isobutyl ketone, carbon tetrachloride, m- and p-xylenes, toluene, o-xylene, benzene, methyl ethyl ketone, chloroform, 1,1,2,2-tetrachloroethane, carbon disulfide and acetone. The solvent is present in an amount to make up 100 wt.% of the composition. Typically, the composition is so formulated as to contain at least about 20 wt.% solvent up to about 80 wt.% solvent and to provide a viscous, paste-like material.

The composition may, advantageously, be further formulated with a pigmentary filler such as zinc oxide, titanium dioxide, calcium carbonate and mixtures thereof. The pigmentary filler is generally present in an amount from about 10 to about 20 wt.% and, preferably, from about 12 to about 15 wt.%.

The compositions of this invention can be prepared by mixing and dissolving the copolymer in the solvent and then adding the silica and optional pigmentary filler with continued mixing to obtain a thick, extrudable, workable, paste-like material which, upon application and evaporation of the solvent, forms an abrasion and peel resistant elastomer.

EXAMPLES

The following examples further illustrate the invention.

The elastomeric block copolymers used in the examples, KRATON 1107 and KRATON 1102, were obtained from Shell Chemical Company, Polymers Division. KRATON 1107 is the trade designation for polystyrene-polyisoprene-polybutadiene copolymer and KRATON 1102 is the trade designation for polystyrene-polybutadiene-polystyrene copolymer. These copolymers are in the form of white crumb which pass through a ½ inch mesh screen and have a specific gravity between 0.93 and 0.94 and a bulk density of approximately 20 to 24 pounds per cubic food. In addition, KRATON 1102 and 1107 have the following physical and electrical properties at 23° C.

|  | KRATON 1102 | KRATON 1107 |
|---|---|---|
| Tensile Strength ($T_B$), psi | 4600 | 3100 |
| 300% Modulus ($M_{300}$), psi | 400 | 100 |
| Elongation ($E_B$), % | 880 | 1300 |
| Angle Tear Strength (ASTM Method D624, die B), pli | 190 | 120 |
| Nicked Crescent Tear Strength (ASTM Method D624, die C), pli | 100 | 130 |
| Trouser Tear Strength, pli | 80 | 95 |
| Volume Resistance, ohm-cm (ASTM D257-61) | $2 \times 10^{16}$ | $2 \times 10^{14}$ |
| Dielectric Strength (ASTM D149-64) | | |
| Short time test, VAC | 20,000 | 35,000 |
| Step-by-step test, volts/mil (500 volt, 10 sec.steps) | 1,000 | 300 |

The silica employed in the examples, NOVACITE L-207A, was obtained from Malvern Minerals Company of Hot Springs, Arkansas. NOVACITE L-207A is the trade designation for finely divided quartz having the following properties:

| | |
|---|---|
| Specific Gravity, 70° F | 2.65 |
| Hardness, Mohs Scale | 7.0 |
| Index of Refraction | 1.55 |
| Bulk Density | |
| Loose Packed, lbs. /cu.ft. | 52.97 |
| Dense Packed, lbs./cu.ft. | 82.75 |
| True Density, lbs./gal. | 22.07 |
| Acidity, pH In Distilled Water | 6.0–6.3 |
| Particle Size | 100% less than 10 micron |
| Average Particle Size | 3.65 micron |
| Oil Absorption | (a) 20 lbs. raw linseed oil to wet exactly 100 lbs. NOVACITE (b) Spatula rub-out method 17 to 20% from coarse to finest respectively |
| Water Absorption | 100 grams NOVACITE absorb 8.7 grams water |

EXAMPLE I

This example illustrates abrasion and peel resistant elastomeric compositions containing KRATON 1107 polystyrene-polyisoprene-polyisoprene copolymer, NOVACITE L-207A silica having a specific gravity of 2.65 and various solvents.

| | Wt.% (Grams) | | | |
|---|---|---|---|---|
| Ingredients | 1A | 1B | 1C | 1D |
| KRATON 1107 | 50 | 50 | 50 | 50 |
| NOVACITE L-207A | 20 | 20 | 20 | 20 |
| 1,1,1-Trichloroethane | 30 | — | — | — |
| Methyl ethyl ketone | — | 30 | — | — |
| Ethylene dichloride | — | — | 30 | — |
| Acetone | — | — | — | 30 |

Each of composition 1A through 1D sets to a hard elastomer having good abrasion and peel resistance.

EXAMPLE II

This example illustrates abrasion and peel resistant elastomeric compositions containing KRATON 1102 polystyrene-polybutadiene-polystyrene copolymer.

| | Wt.% (Grams) | |
|---|---|---|
| Ingredients | 2A | 2B |
| KRATON 1102 | 50 | 40 |
| NOVACITE L-207A | 20 | 30 |
| 1,1,1-Trichloroethane | 30 | 30 |

Compositions 2A and 2B set to elastomers having good abrasion and peel resistance, but 2B sets to a harder elastomer than 2A. These compositions are particularly useful where a more elastic material is required such as in the repair of a tennis shoe upper.

EXAMPLE III

This example illustrates the preparation of abrasion and peel resistant compositions containing KRATON 1107, NOVACITE L-207A, solvent and zinc oxide as a pigmentary filler.

| | Wt.% (Grams) | | | | |
|---|---|---|---|---|---|
| Ingredients | 5A | 5B | 5C | 5D | 5E |
| KRATON 1107 | 50 | 40 | 30 | 20 | 10 |
| NOVACITE L-207A | 10 | 20 | 20 | 30 | 40 |
| Zinc oxide | 10 | 10 | 20 | 20 | 20 |
| 1,1,1-Trichloroethane | 30 | 30 | 30 | 30 | 30 |

Each of compositions 5A through 5E sets to an elastomer which has good abrasion and peel resistance. Compositions 5A–5D set to hard elastomers while composition 5E sets to a semi-rigid elastomer.

EXAMPLE IV

This example illustrates the preparation of an abrasion and peel resistant elastomer of this invention modified with Piccolyte Dipentene 100 Resin, a tackifying resin. Piccolyte is the trade designation for a hydrocarbon thermoplastic terpene resin, composed essentially of polymers of pinene.

| | Wt.% (Grams) |
|---|---|
| Ingredients | 4A |
| KRATON 1107 | 45 |
| NOVACITE L-207A | 20 |
| PICCOLYTE Dipentene 100 Resin | 5 |
| 1,1,1-Trichloroethane | 30 |

Composition 4A sets a hard elastomer with good abrasion resistance and improved peel resistance.

EXAMPLE V

A composition was prepared containing 70 grams of KRATON 1107 and 30 grams of 1,1,1-trichloroethane. This composition sets to an elastomer having poor abrasion resistance.

EXAMPLE VI

This example illustrates the use of clay and mixtures of clay and silica in the preparation of abrasion and peel resistant elastomers containing KRATON 1102 copolymer.

The clay employed in this example, DIXIE CLAY, was obtained from R. T. Vanderbilt Company, Inc. of Norwalk, Connecticut. DIXIE CLAY is the trade designation for kaolin-hydrated aluminum silicate identified further, as follows:

| Chemical analysis | % |
|---|---|
| Silicon dioxide | 44.87 |
| Aluminum oxide | 37.77 |
| Iron oxide | 1.39 |
| Titanium oxide | 1.28 |
| Calcium oxide | 0.07 |
| Magnesium oxide | 0.07 |
| Sodium oxide | 0.04 |
| Potassium oxide | 0.29 |
| Ignition loss | 14.22 |
| Specific gravity | 2.59–2.65 |
| Moisture | 1.0% (max.) |
| Fineness (through 325 mesh) | 99.8% (min.) |

| Ingredients | Wt.% (Grams) | | |
|---|---|---|---|
| | 6A | 6B | 6C |
| KRATON 1102 | 10 | 40 | 25 |
| DIXIE CLAY | 40 | 10 | 15 |
| NOVACITE L-207A | — | — | 15 |
| 1,1,1-Trichloroethane | 50 | 50 | 45 |

Each of compositions 6A through 6C sets to a hard elastomer having good abrasion and peel resistance.

The compositions of this invention may be further formulated with a wide variety of resins, polymers, plasticizers, pigments, fillers, extenders and other ingredients, well known to those in the art, in order to impart particular properties to the abrasion resistant elastomer.

In view of the foregoing description and examples, it will become apparent to those of ordinary skill in the art that equivalent modifications thereof may be made without departing from the spirit and scope of this invention.

That which is claimed is:

1. Abrasion resistant elastomeric compositions for filling, sealing and coating, comprising:
    from about 10 to about 50 wt.% of an elastomeric block copolymer selected from the group consisting of polystyrene-polybutadiene-polystyrene copolymer, polystyrene-polyisoprene-polystyrene copolymer and mixtures of said copolymers, wherein the average molecular weight for each polystyrene block is from about 2,000 to about 100,000, and the average molecular weight for each of said polybutadiene and polyisoprene blocks is from about 25,000 to about 1,000,000;
    from about 10 to about 40 wt.% of silica having a specific gravity from about 2.40 to about 2.66; and
    a solvent for the elastomeric block copolymer to make up 100 wt.% of the composition, with the concentration of said solvent in said composition being at least about 20 wt.%.

2. A composition according to claim 1 wherein the elastomeric block copolymer is present in an amount from about 15 to about 40 wt.%.

3. A composition according to claim 2 wherein the elastomeric block copolymer is further characterized as follows: the average molecular weight for each polystyrene group is from about 5,000 to about 50,000 and the average molecular weight for each of the polybutadiene and the polyisoprene blocks is from about 50,000 to about 500,000.

4. A composition according to claim 1 wherein the silica is present in an amount from about 15 to about 30 wt.% and has a specific gravity from about 2.59 to about 2.66.

5. A composition according to claim 1 which also includes a pigmentary filler in an amount from about 10 to about 20 wt.% based on the weight of the composition.

6. A composition according to claim 5 wherein the pigmentary filler is a member selected from the group consisting of zinc oxide, titanium dioxide, calcium carbonate and mixtures thereof.

7. A composition according to claim 5 wherein the pigmentary filler is present in an amount from about 12 to about 15 wt.%.

8. A composition according to claim 4 wherein silica has a specific gravity of about 2.65.

9. A method for preparing abrasion resistant elastomeric compositions adapted for filling, sealing and coating, which comprises blending and mixing:
    from about 10 to about 50 wt.% of an elastomeric block copolymer selected from the group consisting of polystyrene-polybutadiene-polystyrene copolymer, polystyrene-polyisoprene-polystyrene copolymer, and mixtures of said copolymers, wherein the average molecular weight for each polystyrene block is from about 2,000 to about 100,000, and the average molecular weight for each of said polybutadiene and polyisoprene blocks is from about 25,000 to about 1,000,000;
    from about 10 to about 40 wt.% of silica having a specific gravity from about 2.40 to about 2.66; and
    a solvent for the elastomeric block copolymer to make up 100 wt.% of the composition, with the concentration of said solvent being at least about 20 wt.%;
    said wt.% being based on the weight of the total composition.

10. A method according to claim 9 wherein:
    the elastomeric block copolymer is present in amount from about 15 to about 40 wt.% and is further characterized as follows: the average molecular weight for each polystyrene block is from about 5,000 to about 50,000 and the average molecular weight for each of the polybutadiene and polyisoprene blocks is from about 50,000 to about 500,000; and the silica is present in an amount from about 15 to about 30 wt.% and has a specific gravity from about 2.59 to about 2.66.

11. A method according to claim 9 wherein the blending mix also includes a pigmentary filler selected from the group consisting of zinc oxide, titanium dioxide, calcium carbonate and mixtures thereof in an amount from about 10 to about 20 wt.% based on the weight of the composition.

* * * * *